Patented May 30, 1950

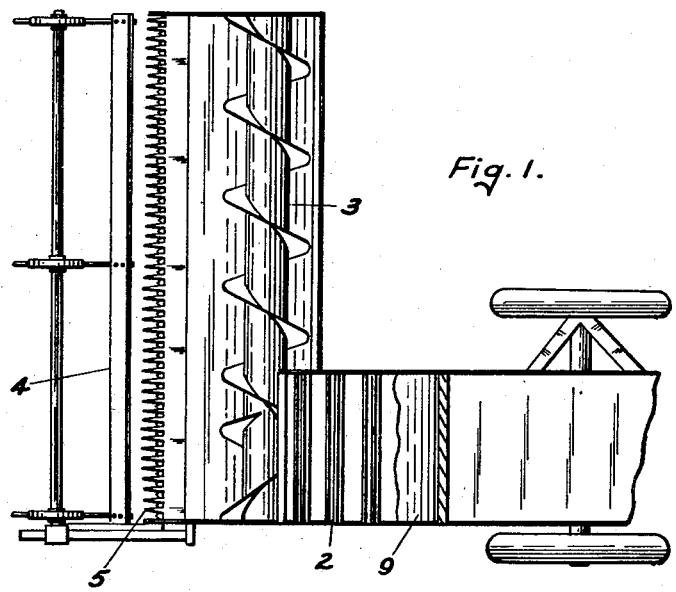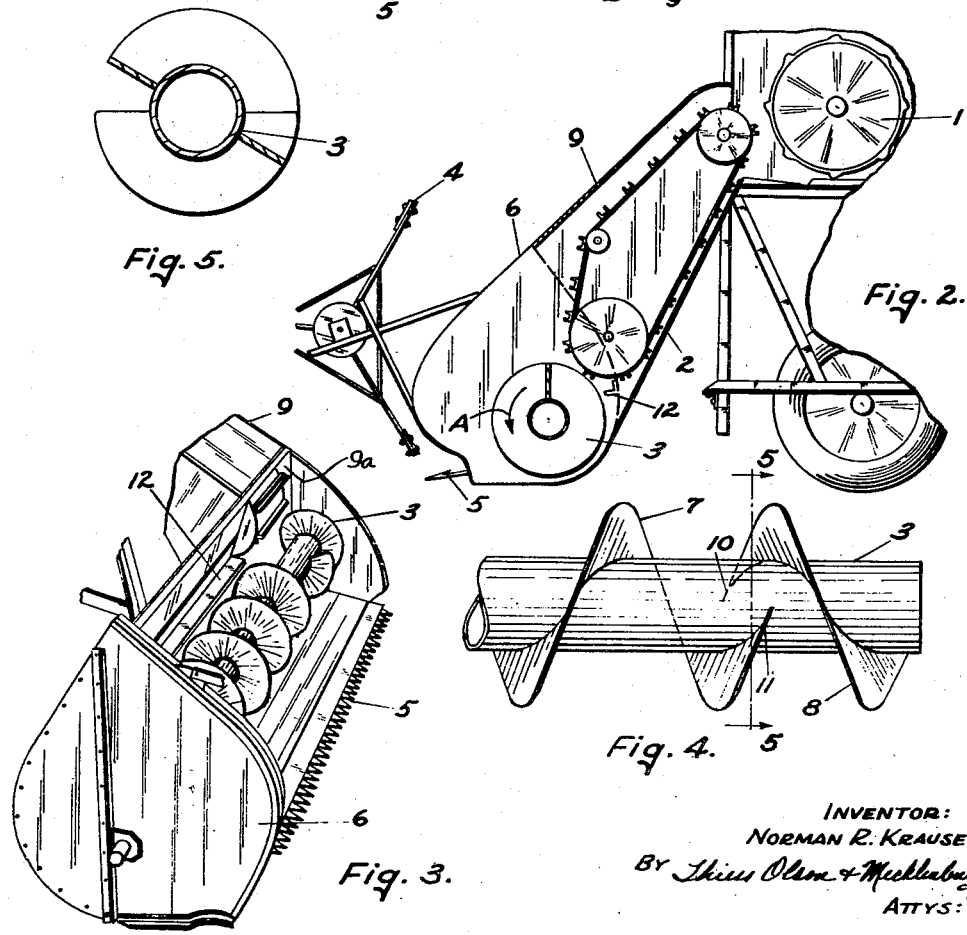

2,509,826

UNITED STATES PATENT OFFICE 2,509,826

FEED AUGER FOR HARVESTING MACHINES

Norman R. Krause, Racine, Wis., assignor to J. I. Case Company, Racine, Wis., a corporation of Wisconsin Application July 13, 1946, Serial No. 683,534

5 Claims. (Cl. 56—153)

My invention relates to feed augers for harvesting machines.

One of the objects of my invention is to provide a harvesting machine having a transversely extending sickle and a screw conveyor in the rear of the sickle and extending substantially the full length thereof, which will deliver all of the cut grain from the screw conveyor at a portion intermediate its ends and in which this delivery is accomplished by means of two helicoidal feed screw formations, one on each side of the intermediate discharge opening and which will feed the cut material in opposite directions from the ends toward an intermediate point of delivery.

A further object of my invention is to provide such a construction for use in a combine in which the material delivered from the auger or screw conveyor is carried upwardly and rearwardly to the threshing mechanism.

A further object is to provide such a construction in which the adjacent ends of the two helicoidal formations overlap each other longitudinally of the conveyor and are spaced from each other so as not to clog the conveyor.

Further objects and advantages of the invention will be apparent from the description and claims.

In the drawings, in which an embodiment of my invention is shown,

Figure 1 is a plan view of a harvester embodying my invention;

Fig. 2 is an elevational view from the left of Fig. 1;

Fig. 3 is a perspective view of the front part of the combine;

Fig. 4 is a plan view showing adjacent parts of the helicoidal formations; and

Fig. 5 is a section on the line 5—5 of Fig. 4.

Referring to the drawings in detail, the construction shown comprises a combine including a threshing mechanism, cutting and feeding apparatus for cutting the grain and delivering it to the threshing apparatus, and a wheeled carriage for the cutting, feeding and threshing apparatus. The threshing apparatus may be of any suitable type comprising a cylinder 1 to which the undershot feeder rake 2 delivers the cut grain delivered to it by the feed auger 3. The reel 4 forces the stalks of grain over toward the sickle 5 where they are cut and pass to the feed auger 3.

The feed auger 3 or screw conveyor operates in an elongated casing 6, the lower side of which is shaped to cooperate with the auger 3 and to provide a channel along which the cut material is forced endwise with respect to the conveyor and delivered to the under side of the endless conveyor or feeder rake 2.

In order that the cut material may be delivered centrally with respect to the feeder rake, two helicoidal formations 7 and 8 are provided—one right-hand and one left-hand, which co-operate to feed the cut material in opposite directions from the ends toward an intermediate part of the conveyor. The conveyor housing 9 is provided with an opening 9ª in front of the lower end of the feeder rake 2, and the lengths of the right- and left-hand screw portions 7 and 8 of the auger 3 are so proportioned that, as the auger 3 rotates in the direction of the arrow A, shown in Fig. 2, the cut grain will be delivered by the auger to the feeder rake 2 at the medial transverse portion of the feeder rake.

In order to provide a clean sweep and to make sure that all of the cut material is delivered from the screw conveyor to the endless conveyor, the adjacent ends of the right-hand and left-hand screw formations of the auger are made to overlap each other longitudinally of the conveyor, as shown in Figs. 3 and 4, and these adjacent ends are spaced from each other as indicated at 10 and 11 in Fig. 4, in order to provide for the free discharge of the cut material from the screw conveyor to the endless conveyor.

In order to insure that the cut material is not carried around by the rotation of the screw conveyor, a stripper bar 12 is provided in the rear of the conveyor, as shown in Figs. 1, 2, and 3.

Further modifications will be apparent to those skilled in the art, and it is desired, therefore, that the invention be limited only by the scope of the appended claims.

Having thus described my invention, what I claim and desire to secure by Letters Patent is:

1. In a grain harvesting and threshing machine, cutting mechanism extending transversely of the line of travel of the machine, a conveyor auger in the rear of said cutting mechanism, said auger and cutting mechanism being mutually coextensive, an elongated casing in which said auger operates, the lower side of which is shaped to receive the cut grain from the cutting mechanism and to cooperate with the auger to provide a channel along which the auger forces the grain endwise, an endless raddle type conveyor directly in the rear of the stubbleward end of the auger, the lower run of which extends and travels upwardly and rearwardly from the auger in a direction substantially tangential to the lower rear perimeter of the auger, for carrying the grain toward the threshing mechanism, a rotor about which the lower end of the endless conveyor travels positioned to cause the raddles to travel downwardly and rearwardly in a cylindrical path substantially tangential to the cylindrical path of the periphery of the auger blading at a point above and to the rear of the axis of the auger to sweep the grain from the outer edge of the helical auger blading, and a housing for said endless conveyor, the lower portion of which extends upwardly and rearwardly from the auger casing, underneath, adjacent and parallel to the lower upwardly and rearwardly travelling run of the endless conveyor.

2. In a grain harvesting and threshing machine, cutting mechanism extending transversely of the line of travel of the machine, a conveyor auger in the rear of said cutting mechanism, said auger and cutting mechanism being mutually coextensive, an elongated casing in which said auger operates, the lower side of which is shaped to receive the cut grain from the cutting mechanism and to cooperate with the auger to provide a channel along which the auger forces the grain endwise, an endless raddle type conveyor directly in the rear of the stubbleward end of the auger, the lower run of which extends and travels upwardly and rearwardly from the auger in a direction substantially tangential to the lower rear perimeter of the auger, for carrying the grain toward the threshing mechanism, a rotor about which the lower end of the endless conveyor travels positioned to cause the raddles to travel downwardly and rearwardly in a cylindrical path substantially tangential to the cylindrical path of the periphery of the auger blading at a point above and to the rear of the axis of the auger to sweep the grain from the outer edge of the helical auger blading, and a housing for said endless conveyor, the lower portion of which extends upwardly and rearwardly from the auger casing, underneath, adjacent and parallel to the lower upwardly and rearwardly travelling run of the endless conveyor, said auger comprising a right-hand feeder blade having a generally helical peripheral edge, and a left-hand feeder blade having a generally helical peripheral edge, said blades having their inner ends adjacent each other but spaced apart sufficiently to enable ready passage of the cut grain including the stalk or straw between the adjacent ends, the direction of rotation and the pitch of the helical edges of said blades being such as to force the cut grain from the ends of the channel toward an intermediate part of the channel, said casing having a lateral opening adjacent the adjacent ends of the blades, and sweep means travelling in a cylindrical path substantially tangential to the cylindrical path of the periphery of the auger blading adjacent the adjacent ends of the blades and in a direction opposed to the travel of the adjacent blading for sweeping the cut grain including the stalk or straw from said auger through said opening.

3. In a grain harvesting and threshing machine, cutting mechanism extending transversely of the line of travel of the machine, a conveyor auger in the rear of said cutting mechanism, said auger and cutting mechanism being mutually coextensive, an elongated casing in which said auger operates, the lower side of which is shaped to receive the cut grain from the cutting mechanism and to cooperate with the auger to provide a channel along which the auger forces the grain endwise, an endless raddle type conveyor directly in the rear of the stubbleward end of the auger, the lower run of which extends and travels upwardly and rearwardly from the auger in a direction substantially tangential to the lower rear perimeter of the auger, for carrying the grain toward the threshing mechanism, a rotor about which the lower end of the endless conveyor travels positioned to cause the raddles to travel downwardly and rearwardly in a cylindrical path substantiall tangential to the cylindrical path of the periphery of the auger blading at a point above and to the rear of the axis of the auger to sweep the grain from the outer edge of the helical auger blading, and a housing for said endless conveyor, the lower portion of which extends upwardly and rearwardly from the auger casing, underneath, adjacent and parallel to the lower upwardly and rearwardly travelling run of the endless conveyor, said auger comprising a right-hand feeder blade having a generally helical peripheral edge, and a left-hand feeder blade having a generally helical peripheral edge, said blades having their inner ends adjacent each other but spaced apart sufficiently to enable ready passage of the cut grain including the stalk or straw between the adjacent ends, the direction of rotation and the pitch of the helical edges of said blades being such as to force the cut grain from the ends of the channel toward an intermediate part of the channel, said casing having a lateral opening adjacent the adjacent ends of the blades, and sweep means travelling in a cylindrical path substantially tangential to the cylindrical path of the periphery of the auger blading adjacent the adjacent ends of the blades and in a direction opposed to the travel of the adjacent blading for sweeping the cut grain including the stalk or straw from said auger through said opening, said blades overlapping each other longitudinally of the axis of the auger.

4. In a grain harvesting and threshing machine, a conveyor auger extending transversely of the line of travel of the machine to which grain, including the stalk, or straw is delivered, an elongated casing in which said auger operates shaped to provide a channel along which the auger forces the grain endwise, said auger comprising a right-hand feeder blade having a generally helical peripheral edge, and a left-hand feeder blade having a generally helical peripheral edge, said blades having their inner ends adjacent each other but spaced apart sufficiently to enable ready passage of the cut grain including the stalk or straw between the adjacent ends, the direction of rotation and the pitch of the helical edges of said blades being such as to force the cut grain from the ends of the channel toward an intermediate part of the channel, said casing having a lateral opening adjacent the adjacent ends of the blades, and sweep means travelling in a cylindrical path substantially tangential to the cylindrical path of the periphery of the auger blading adjacent the adjacent ends of the blades and in a direction opposed to the travel of the adjacent blading for sweeping the cut grain including the stalk or straw from said auger through said opening.

5. In a grain harvesting and threshing machine, a conveyor auger extending transversely of the line of travel of the machine to which grain, including the stalk, or straw is delivered, an elongated casing in which said auger operates shaped to provide a channel along which the auger forces the grain endwise, said auger comprising a right-hand feeder blade having a generally helical peripheral edge, and a left-hand feeder blade having a generally helical peripheral edge, said blades having their inner ends adjacent each other but spaced apart sufficiently to enable ready passage of the cut grain including the stalk or straw between the adjacent ends, the direction of rotation and the pitch of the helical edges of said blades being such as to force the cut grain from the ends of the channel toward an intermediate part of the channel, said casing having a lateral opening adjacent the adjacent ends of the blades, and sweep means travelling in a cylindrical path substantially tangential to the cylindrical path of the periphery of the auger blading adjacent the adjacent ends of the blades and in a direction opposed to the travel of the adjacent blading for sweeping the cut grain including the stalk or straw from said auger through said opening, said blades overlapping each other longitudinally of the axis of the auger.

NORMAN R. KRAUSE.

REFERENCES CITED

The following references are of record in the file of this patent:

UNITED STATES PATENTS

| Number | Name | Date |
|---|---|---|
| Re. 21,161 | Korsmo et al. | July 25, 1939 |
| 2,262,580 | Frankland | Nov. 11, 1941 |
| 2,292,650 | Oehler et al. | Aug. 11, 1942 |
| 2,332,006 | Oehler | Oct. 19, 1943 |